United States Patent [19]

Libersky

[11] 4,046,274
[45] Sept. 6, 1977

[54] POWER ASSIST HITCH FOR A HAY TRANSPORT

[76] Inventor: Kenneth E. Libersky, 303 E. 1st St., St. Ansgar, Iowa 50472

[21] Appl. No.: 731,785

[22] Filed: Oct. 12, 1976

[51] Int. Cl.² .......................... B60P 1/16; B60P 1/38
[52] U.S. Cl. ................................. 214/506; 214/508; 280/482
[58] Field of Search ............. 214/350, 351, 505, 506, 214/508; 280/482

[56] References Cited
U.S. PATENT DOCUMENTS

| 3,244,434 | 4/1966 | Reed et al. | 280/482 X |
| 3,415,400 | 12/1968 | Olin | 214/505 |

Primary Examiner—Robert G. Sheridan
Attorney, Agent, or Firm—Henderson, Strom and Sturm

[57] ABSTRACT

A hay transport having a bed mounted upon an axle, the bed being pivotable about the axle. A frame extends forwardly from the axle, and a tilt cylinder is affixed between the frame and the bed. A support structure has an inner sleeve affixed thereto. An outer sleeve slides over the inner sleeve, and a horizontal hitch cylinder is disposed within the inner sleeve. The hitch cylinder is affixed between the frame and the support structure, and the outer sleeve slides upon the inner sleeve as the hitch cylinder is operated. The support structure bears control mechanisms and is affixed to a prime mover. Actuation of the hitch cylinder causes the hay transport to be moved away from the primer mover.

4 Claims, 10 Drawing Figures

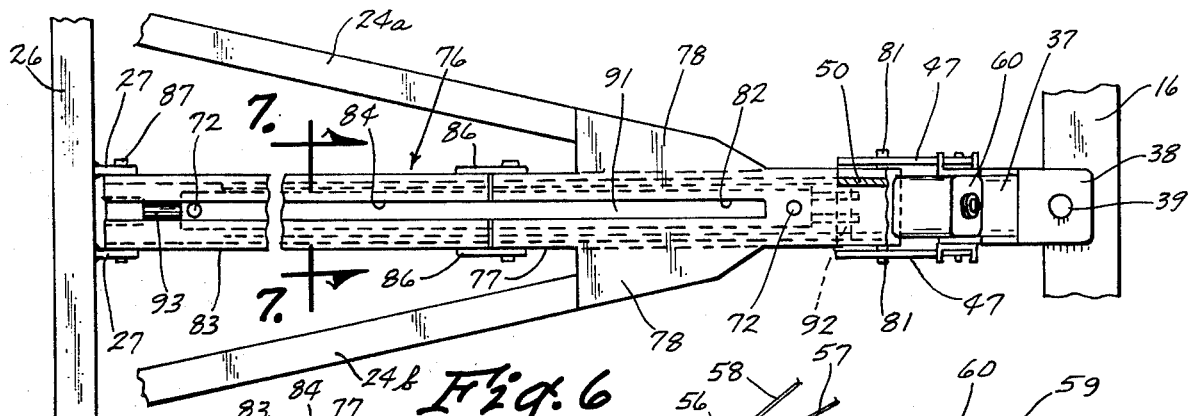
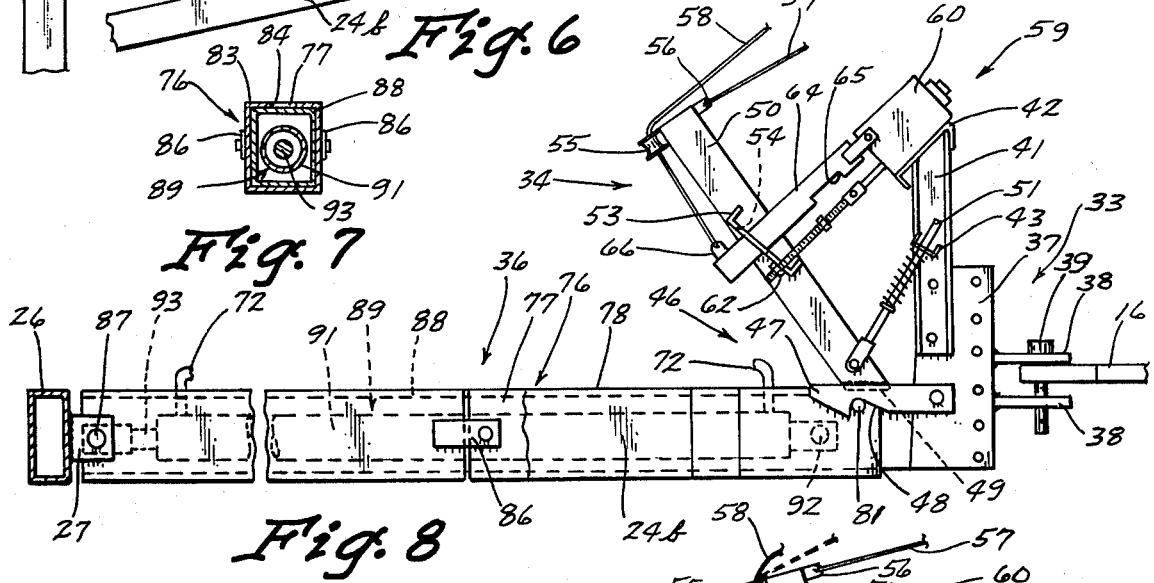
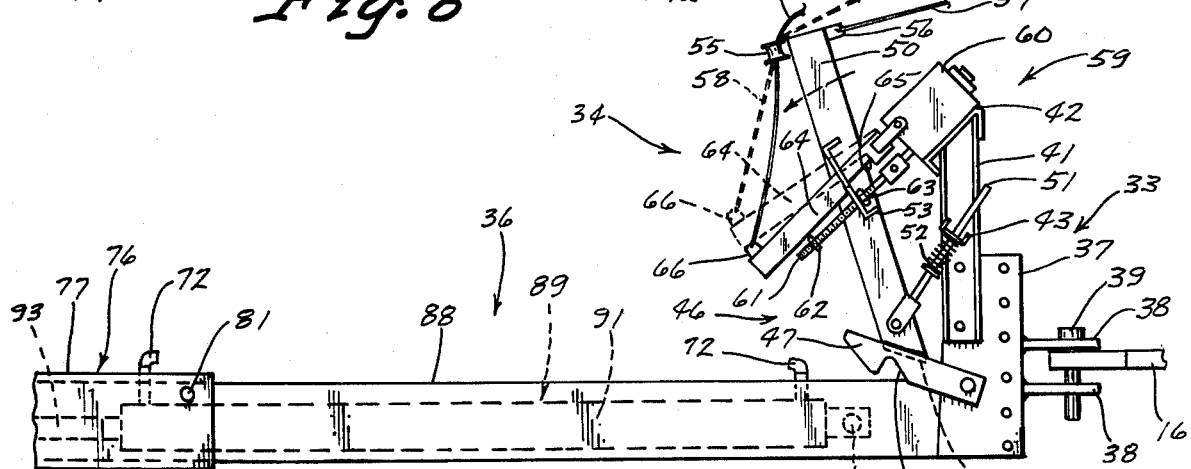
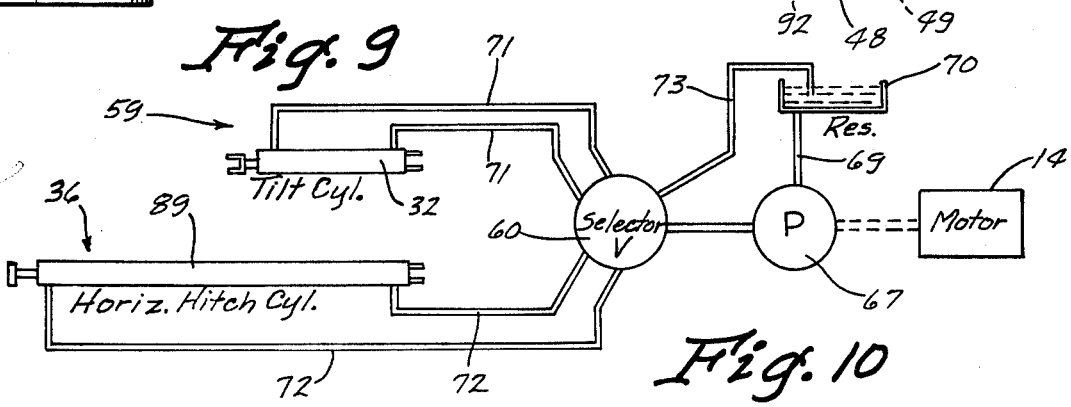

POWER ASSIST HITCH FOR A HAY TRANSPORT

BACKGROUND OF THE INVENTION

This invention relates to trailers and transports and more particularly to transports used for moving stacks of hay and the like. Such transports commonly include a bed pivotally mounted upon an axle. The axle is also affixed to a frame. The frame is hitched to a prime mover such as a tractor. A hydraulic tilt cylinder is attached between the bed and the frame, and operation of the cylinder causes the bed to pivot about the axle.

When these transports are used, the bed is tilted such that one end of the bed is against the ground adjacent the edge of the stack of hay to be moved. The tractor is then driven such that the bed is pushed underneath the stack. The bed commonly includes a plurality of longitudinal beams bearing endless chains. These chains are actuated and aid in pulling the stack onto the transport while the tractor is pushing the transport under the stack. When the stack is completely on the transport, the tilt cylinder is actuated to level the bed. The tractor then can pull the transport. When the stack of hay or the like has been brought to the desired location, the stack is unloaded by tilting the bed, reversing the movement of the chains, and pulling the transport out from underneath the stack with the tractor.

There are a number of disadvantages attendant upon the usage of present transports. Since the tractor must push the transport beneath the stack, slippery conditions caused by mud, rain and snow, with consequent loss of traction for the tractor, render the operation extremely inefficient and difficult to perform. Repeated performance of the operation places much strain on the clutch of the tractor thereby causing excessive wear. Slippage of the tractor clutch is a frequent occurrence during the performance of the operation rendering the operation inefficient. Under less than ideal operating conditions, the stack can quite frequently be torn apart due to the aforementioned difficulties.

SUMMARY OF THE INVENTION

A power assist hitch is employed with a hay transport. The hay transport has a frame affixed to an axle and extended forwardly therefrom and has an elongated bed pivotally affixed to the axle. A hydraulic tilt cylinder is attached between the bed and the frame. The power assist hitch includes a support assembly having inner and outer sleeves, the outer sleeve being slidable over the inner sleeve. A hydraulic horizontal hitch cylinder is disposed within the inner sleeve and is affixed between the frame and the support assembly. The power assist hitch also includes a control assembly mounted upon the support assembly. The control assembly includes hydraulic controls for operating both the tilt and horizontal hitch cylinders. Safety locking controls are affixed to the support assembly, and the support assembly is affixed to a prime mover such as a tractor.

The tractor is locked in a stationary position. The bed of the hay transport is pivoted about the axle by actuation of the tilt cylinder. Operation of the safety locking controls locks the tilt cylinder and frees the horizontal hitch cylinder for operation. Actuation of the horizontal cylinder drives the bed a substantial distance beneath the stack of hay or the like. The tractor is then moved toward the stack. When the stack is on the bed, the horizontal cylinder is operated to pull the transport toward the tractor and is then locked. The tilt cylinder then levels the bed.

It is an object of this invention to provide a power assist hitch which provides for more efficient loading and moving of stacks of hay and the like.

Another object of this invention is to provide a power assist hitch which provides for easier and more effective loading and moving operations during adverse conditions caused by mud, rain or snow.

It is also an object of this invention to provide a power assist hitch which saves wear and tear on tractors and enables tractors to be used more efficiently and effectively.

Still another object of this invention is to provide a power assist hitch which minimizes the tearing of stacks during loading and moving operations and the consequent wastage of hay or the like.

A further object of this invention is to provide a power assist hitch employing mechanisms which render safer the loading and moving of stacks.

An additional object of this invention is to provide a power assist hitch which is operable to aid in moving a tractor which has become stuck.

Yet another object of this invention is to provide a hay transport incorporating a power assist hitch and capable of achieving the aforementioned objects.

These objects and other features and advantages of this invention, a power assist hitch for a hay transport, will become readily apparent upon referring to the following description, when taken in conjunction with the appended drawing.

BRIEF DESCRIPTION OF THE DRAWING

The power assist hitch for a hay transport is illustrated in the drawing wherein:

FIGS. 3, 4 and 5 are reduced, fragmentary elevational views illustrating the operation of loading a stack of hay or the like;

FIG. 6 is an enlarged, fragmentary foreshortened top plan view of the power assist hitch, portions of the control assembly thereof being cut away for greater clarity;

FIG. 7 is an enlarged, cross-sectional view of part of the power assist hitch taken along line 7—7 in FIG. 6;

FIG. 8 is an enlarged, fragmentary, foreshortened elevational view of the power assist hitch, portions thereof being cut away for greater clarity;

FIG. 9 is an enlarged, fragmentary elevational view showing the cylinder assembly of the power assist hitch in extended position; and FIG. 10 is a schematic illustration of the hydraulic control portion of the control assembly.

DESCRIPTION OF THE PREFERRED EMBODIMENT

Figure 1:
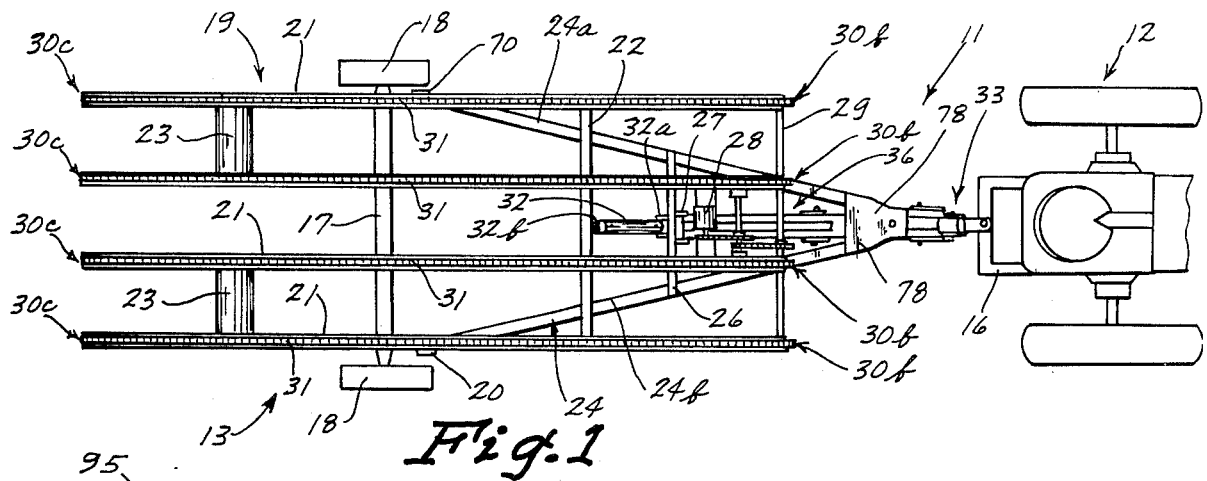
FIG. 1 is a fragmentary, top plan view of a hay transport with a power assist hitch and in attachment with a tractor.

The power assist hitch is indicated generally at 11 in FIG. 1 disposed between a tractor 12 and a trailer or transport 13 for hay and the like. The motor 14 of the tractor 12 is indicated at 14 in FIG. 10. A hitch 16 is affixed to the rear of the tractor 12.

The transport 13 (FIGS. 1, 2 and 6) includes an axle member 17. Wheels 18 are mounted at each end of the axle 17. A bed 19 is pivotally mounted upon the axle 17. The bed 19 includes a plurality of elongated, longitudinal beams 21. The beams 21 are interconnected at the pivotal attachment upon the axle 17 and by transverse members 22. The number of transverse members 22 employed depends upon the size of the transport 13, only one transverse member 22 being shown in FIG. 1. Flotation rollers or wheels 23 are rotatable affixed between the beams 21 adjacent the rear of the bed 19.

The transport 13 also includes a frame 24. The frame 24 includes right and left members 24a, 24b which are disposed at an acute angle with respect to each other, as shown in FIG. 1. The frame 24 may be rigidly affixed to the axle 17, as shown in FIGS. 2, 3, 4 and 5, or the frame 24 may be pivotally affixed to the bed 19 at points 20 adjacent to, and immediately forward of, the axle 17. The frame 24 extends forward from the axle 17, and the frame members 24a, 24b and axle 17 indicate a triangle when viewed in plan (FIG. 1). A cross member 26 (FIGS. 1 and 6) interconnects the frame members 24a, 24b and is disposed parallel to the axle 17. Mounting brackets 27 are affixed normal to cross member 26, are centrally disposed, and extend toward the front of the transport 13.

A PTO-driver gearbox structure 28 (FIG. 1) is affixed to the bed 19 adjacent the forward end of the bed 19. The structure 28 is disposed between adjacent beams 21. A transversely disposed drive shaft 29 is rotatably mounted through the front ends of the beams 21. A drive sprocket 30a and a plurality of front sprockets 30b are borne by the shaft 29. The gearbox structure 28 is coupled to the drive sprocket 30a as by a chain. A front sprocket 30b is disposed within the front end of each beam 21. A rear sprocket 30c is disposed within the rear end of each beam 21. An endless bed chain 31 is disposed within each beam 21 and over the sprockets 30b, 30c. A double-acting hydraulic tilt cylinder 32 is pivotally mounted at 32a to the cross member 26 and at 32b to the transverse member 22.

The power assist hitch 11 (FIGS. 8 and 9) includes more particularly a support assembly 33, a control assembly 34 and a cylinder assembly 36. The support assembly 33 includes a substantially vertically disposed main member 37. The main member 37 has affixed normal thereto brackets 38. The hitch 16 is disposed between the brackets 38, and a hitch pin 39 passes downwardly through the brackets 38 and hitch 16 when the support assembly 33 is coupled to the tractor 12. A member 41 is affixed to the main member 37 and extends upwardly therefrom. A plate 42 is affixed to the upper end of the member 41, is disposed at an angle thereon and faces approximately upward and toward the transport 13. A plate 43 is affixed normal to the side, and intermediate the ends of the member 41. The plate 43 is oriented such that a line passing through the plate 43, normal to the surfaces thereof, extends downwardly therefrom and toward the transport 13 and upwardly therefrom and toward the tractor 12. An articulated support member 44, illustrated in FIGS. 2-5, extends between the cylinder assembly 36 and the member 41.

The control assembly 34, FIGS. 8, 9 and 10, includes a safety control portion 46. The safety control 46 includes latch arms 47 pivotally affixed to the main member 37. Each of the latch arms 47 have a notch 48 which is disposed in the underside of the arm 47 when the arm 47 has been pivoted rearwardly toward the transport 13. A plate 49 interconnects the arms 47. A control arm 50 is affixed to the plate 49 at an angle thereto such that, when the plate 49 is horizontally disposed, the arm 50 extends upwardly and away from the members 37, 41. A rod 51 is pivotally affixed to the control arm 50 and extends upwardly therefrom and through the side plate 43. A spring 52 is fitted over the rod 51 and extends between the side plate 43 and a nut affixed between the ends of the rod 51. An elongated control plate 53 is affixed normal to the side of the control arm 50, the plate 53 being disposed such that the upper end thereof is adjacent the edge of the arm 50 facing the trailer 13 and the lower end thereof adjacent the opposite edge of the arm 50. A longitudinal slot 54 is formed in the control plate 53.

A spool like guide member 55 is affixed to the edge of the control arm 50 facing the trailer 13. A loop member 56 is affixed to the opposite edge of the control arm 50. Both members 55, 56 are affixed adjacent to the upper end of the arm 50. A first control cable 57 extends from the tractor 12 and is affixed to the loop 56. A second control cable 58 extends from the tractor 12 and is received through the guide 55.

The control assembly 34 also includes a hydraulic control portion 59 (FIGS. 8, 9 and 10). The hydraulic control 59 employs a two-position, spool selector valve 60. The valve 60 is affixed to the slanted plate 42. A movable control rod 61 extends outwardly from the valve 60 and through the control plate 53 below the slot 54. A first nut 62 is affixed to the rod 61 adjacent the extended end thereof, and a second nut 63 is affixed to the rod 61 toward the center thereof. A second control arm 64 is pivotally affixed to the valve 60 and extends therefrom through the slot 54. A notch 65 is formed in the downwardly disposed edge of the arm 64 proximate to the valve 60. A loop 66 is affixed to the upwardly disposed edge of, and adjacent the extended end of, the arm 64. The second control cable 58 is affixed to the loop 66. A pump 67 (FIG. 10), disposed upon the tractor 12, is driven by the tractor motor 14. Line 68 leads from the pump 67 to the valve 60, and line 69 leads from the pump 67 to the reservoir 70. Lines 71 lead from the valve 60 to the double-acting tilt cylinder 32. Lines 72 lead from the valve 60 to the cylinder assembly 36. A line 73 leads from the valve 60 to the reservoir 70. The lines 68, 71, 72, 73 have not been shown in FIGS. 1-9, with the exception of lines 72 in FIGS. 6-9, so that the drawing would remain uncluttered. Lines 68, 73 do extend back toward the tractor 12 from the valve 60. Lines 71, 72 do extend from the valve 60 away from the tractor 12, the articulated member 44 and the frame 24 supporting the lines 71 extending toward the tilt cylinder 32.

The cylinder assembly 36 (FIGS. 6-10) includes an external slide cylinder shaft 76. The shaft 76, FIGS. 6, 7 and 8, includes a forward portion 77. The frame members 24a, 24b are affixed to the sides, and adjacent the forward end, of the portion 77. Gussets 78 further interconnect the frame 24 and the shaft 76. A pivot mounting 79, shown in FIGS. 2-5 but cut away in FIGS. 6 and 8, is attached to one of the gussets 78. The articulated member 44 is received by the mounting 79. A pair of cylindrical projections 81 are attached normal to opposite sides, and adjacent the front end, of the portion 77. The projections 81 are received in the notches 48 when the latch arms 47 are pivoted downwardly. A longitudinal notch 82 is formed in the top of the forward portion 77. The notch 82 communicates with the rear edge of the portion 77.

The external slide cylinder shaft 76 also includes a rear portion 83. A longitudinal slot 84 is formed in the top of the rear portion 83. As shown in FIG. 7, the forward and rear portions 77, 83 are substantially rectangular in cross section, and the slot 84 communicates with the notch 82. Plates 86 interconnect the forward and rear portions 77, 83. A mounting pin 87 passes through the rear portion 83 and brackets 27 to further mount the shaft 76 to the frame 24.

The cylinder assembly 36 also includes an internal slide cylinder shaft 88. The shaft 88 is attached to the main member 37 and extends rearwardly therefrom. The shaft 88 is slidably received within the shaft 76. As shown in FIG. 7, the shaft 88 is substantially rectangular in cross section. A double-acting horizontal hitch cylinder 89 is disposed within the shafts 88, 76. The cylinder housing 91 is pivotally attached at 92 to the inside of shaft 88 adjacent member 37. The cylinder piston arm 93 is extendable toward the transport 13 and is pivotally affixed to the frame 24 by mounting pin 87. The hydraulic lines 72 are coupled to each end of the cylinder 89, the rearwardly disposed line 72 traveling within the notch 82 and slot 84 during operation of the power assist hitch 11.

The operation of the power assist hitch 11 is best shown in FIGS. 8 and 9. FIG. 8 illustrates the normal rest position of the power assist hitch 11, the shaft 88 being slid within the shaft 76. The safety control member 46 locks the shafts 76, 88 against movement with respect to each other, the projections 81 being engaged by the notches 48 of the downwardly pivoted latch arms 47. The valve 60 is in a condition such that only the tilt cylinder 32 may be actuated.

When the power assist hitch 11 is used, the tilt cylinder 32 is actuated first to pivot the bed 19 about the axle 17. Then the first control cable 57 is engaged and pulled. The control arm 50 is moved upwardly and toward the tractor 12, pivoting upwardly and disengaging the latch arms 47 from the projections 81. The control plate 53 engages the second nut 63, and the control rod 51 is pushed inwardly to switch the selector valve 60. The second control arm 64 is further extended through the slot 54, and the control plate 53 is engaged by the notch 65. The control assembly 34 has assumed the position indicated in FIG. 9, the safety control 46 being disengaged to permit relative movements of the shafts 76, 88, and the hydraulic control 59 being switched such that only the horizontal hitch cylinder 89 can be operated. The tilt cylinder 32 is locked such that the bed 19 remains in pivoted position. The operation of loading a stack 95 of hay or the like, depicted in FIGS. 3-5, can then be undertaken, the hitch cylinder 89 being actuated to slide the shafts 76, 88 with respect to each other. FIG. 9 illustrates the shafts 76, 88 in extended position.

Figure 2:
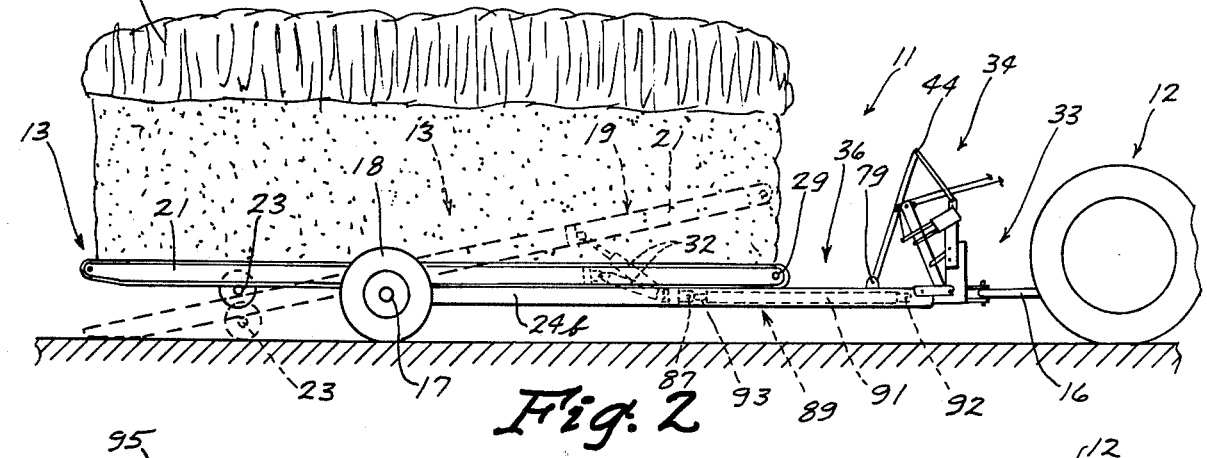
FIG. 2 is a fragmentary, elevational view of a stack of hay or the like supported upon the hay transport, the tilted position of the hay transport being illustrated in dotted lines.
Figure 3:
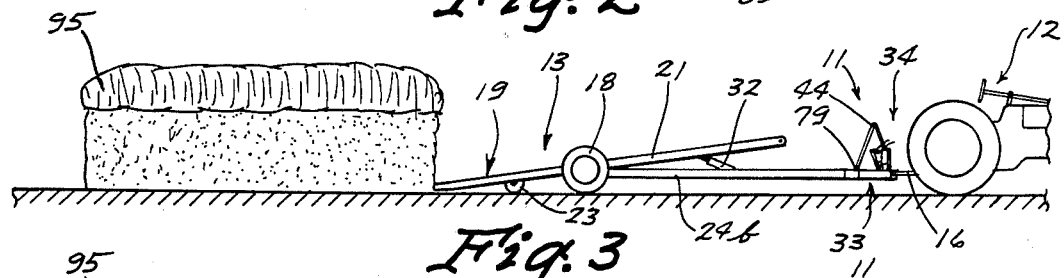
Figure 4:
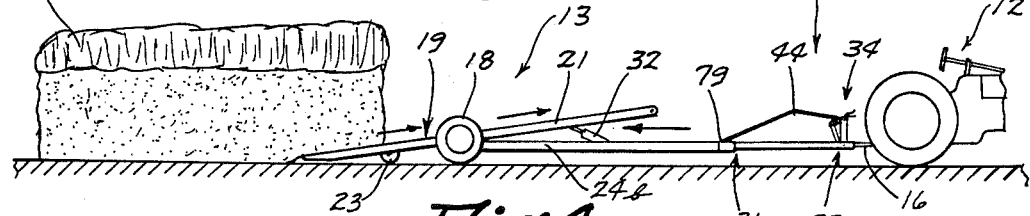
Figure 5:
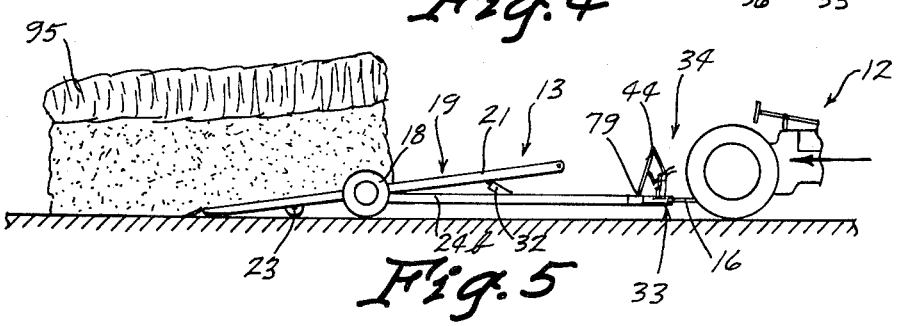

After the operation shown in FIGS. 3-5 is completed and the shafts 76, 88 have been returned to the retracted position shown in FIG. 8, the second control cable 58 is then engaged and pulled. The second control arm 64 is pivoted upwardly, as shown in dotted lines in FIG. 9, and the control plate 53 is disengaged from the notch 65. The first control cable 57 having already been disengaged, the control arm 50 moves downwardly and away from the tractor 12. The spring 52 encourages the downward movement. The latch arms 47 reengage the projections 81. The control plate 53 engages the first nut 62, and the control rod 61 is moved outwardly from, and switches, the selector valve 60. The shafts 76, 88 are again locked against relative movement, and the valve 60 is now set such that only the tilt cylinder may be operated. The control assembly 34 has again assumed the position shown in FIG. 8. The tilt cylinder 32 is then operated such that the bed 19 supporting the stack 95 is leveled, as shown in FIG. 2.

The operation of the power assist hitch 11 and transport 13 in loading a stack 95 of hay or the like is illustrated in FIGS. 2-5. The tractor 12 backs the transport 13 to the edge of the stack 95, and the bed 19 is tilted by operation of the cylinder 32 (FIG. 3). The tilted position of the bed 19 is clearly shown in dotted lines in FIG. 2. The brakes of the tractor 12 are then set, and the power assist hitch 11 is operated to extend the transport 13 away from the tractor 12 and a substantial distance beneath the stack 95 (FIG. 4). The tractor 12 may then be backed toward the stack 95 to further facilitate loading of the stack 95 (FIG. 5). During the phases of the operation shown in FIGS. 4 and 5, the structure 28 is driving the bed chains 31 to facilitate the loading of the stack 95. The flotation rollers 23 prevent the rear end of the bed 19 from digging into the ground during the operation. After the stack 95 has been loaded, the transport 13 and power assist hitch 11 assume the positions shown in FIG. 2 for transportation of the stack 95.

By using the tractor 12 as a dead weight, a transport 13 is much more easily inserted beneath a stack 95. The power assist hitch 11 obviates wear and tear on the clutch of the tractor 12 and clutch slippage is no longer a problem. Adverse weather conditions no longer hamper loading and moving operations, for the tractor 12 remains stationary, and cannot slide, while the transport 13 is being inserted beneath the stack 95. The stack 95 is much less likely to be torn up, and hay or the like wasted, due to the lack of slippage by the tractor 12. Safety mechanisms prevent the operation of both cylinders 32, 89 simultaneously or relative movement of the shafts 76, 88 at the wrong time. By anchoring the transport 13, the operation of the power assist hitch 11 can be employed to aid in moving a tractor 12 which has become stuck.

Although a preferred embodiment has been disclosed herein, it is to be remembered that various modifications and alternate constructions can be made thereto without departing from the full scope of the invention, as defined in the appended claims.

I claim:

1. A power assist hitch for use with a tractor and a transport for loading and moving stacks, the transport having a bed pivotable by a tilt cylinder, said hitch comprising:

support means including a main support, the tractor being detachably hitched to said main support;

cylinder means including an external shaft, an internal shaft and a hitch cylinder, said internal shaft being affixed to said main support, said external shaft being attached to the transport, said internal shaft being slidably received within said external shaft, said hitch cylinder being attached at one end to said main support, at the other end to said transport, and disposed within said internal and external shafts; and control means for selectively actuating said cylinder means and the tilt cylinder, said control means including first means for locking said shafts against relative movement and second means for selectively operating said hitch cylinder and the tilt cylinder, said control means being attached to said main support and having couplings to the tractor, the tilt cylinder and said cylinder means.

2. A power assist hitch as defined in claim 1 and further wherein said support means includes an articulated support, said articulated support being attached between said main support and said external shaft, said articulated support bearing said coupling to the tilt cylinder.

3. A power assist hitch as defined in claim 1 and further wherein said external shaft includes a plurality of external projections, said first means including latches and a control arm, said latches being pivotally affixed to said main support, said control arm being affixed to said latches, movement of said control arm imparting movement to said latches, said external projections being engageable by said latches whereby said external shaft is locked against movement with respect to said internal shaft.

4. A power assist hitch as defined in claim 3 and further wherein said second means includes a valve means for switching between said hitch cylinder and the tilt cylinder, said valve means being mounted upon said main support and having extending therefrom a control rod, said control arm having a control plate affixed thereto, said control plate engaging said control rod and moving said control rod when said control arm is moved, said valve means being switched by movement of said control rod.

* * * * *